(12) United States Patent
Anders et al.

(10) Patent No.: US 9,866,476 B2
(45) Date of Patent: Jan. 9, 2018

(54) PARALLEL DIRECTION DECODE CIRCUITS FOR NETWORK-ON-CHIP

(71) Applicant: Intel Corporation, Santa Clara, CA (US)

(72) Inventors: Mark A. Anders, Hillsboro, OR (US); Gregory K. Chen, Portland, OR (US); Himanshu Kaul, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 14/574,106

(22) Filed: Dec. 17, 2014

(65) Prior Publication Data

US 2016/0182367 A1    Jun. 23, 2016

(51) Int. Cl.
| | | |
|---|---|---|
| *H04L 12/771* | (2013.01) | |
| *H04L 12/801* | (2013.01) | |
| *H04L 12/933* | (2013.01) | |
| *H04L 12/721* | (2013.01) | |
| *H04L 12/773* | (2013.01) | |
| *H04L 12/947* | (2013.01) | |

(52) U.S. Cl.
CPC .............. *H04L 45/72* (2013.01); *H04L 45/60* (2013.01); *H04L 49/25* (2013.01); *H04L 47/33* (2013.01); *H04L 49/109* (2013.01)

(58) Field of Classification Search
CPC ....... H04L 45/60; H04L 45/72; H04L 45/583; H04L 49/109; H04L 49/3018; H04L 49/3027; H04L 49/25
See application file for complete search history.

(56) References Cited

U.S. PATENT DOCUMENTS

| | | | | |
|---|---|---|---|---|
| 6,285,679 B1* | 9/2001 | Dally | ................... | H04L 45/00 370/412 |
| 8,284,766 B2 | 10/2012 | Anders et al. | | |
| 8,601,423 B1* | 12/2013 | Philip | ................ | G06F 17/5072 703/15 |
| 9,036,482 B2* | 5/2015 | Lea | ......................... | H04L 47/32 370/236 |
| 9,507,745 B1* | 11/2016 | Bratt | ...................... | G06F 12/10 |
| 9,634,866 B2* | 4/2017 | Anders | ............... | H04L 12/6418 |
| 2006/0077914 A1 | 4/2006 | Rhee | | |

(Continued)

FOREIGN PATENT DOCUMENTS

| | | |
|---|---|---|
| JP | 5276220 B2 | 8/2013 |
| WO | WO 2014/209391 | 12/2014 |

OTHER PUBLICATIONS

Evgeny Bolotin et al., "QNoC: QoS Architecture and Design Process for Network on Chip", Journal of Systems Architecture, Feb. 2004, vol. 50, Issues 2-3, pp. 105-128.

(Continued)

*Primary Examiner* — Ahmed Elallam
(74) *Attorney, Agent, or Firm* — Patent Capital Group

(57) ABSTRACT

A first packet and a first direction associated with the first packet are received. The first packet is forwarded to an output port of a plurality of output ports of the first router based on the first direction associated with the first packet. A second direction associated with the first packet is determined. The second direction is based at least on an address of the first packet. The first packet and the second direction are forwarded through the output port of the first router to a second router.

20 Claims, 7 Drawing Sheets

(56) References Cited

U.S. PATENT DOCUMENTS

| | | | |
|---|---|---|---|
| 2012/0134364 A1* | 5/2012 | Coppola | H04L 49/25 370/400 |
| 2013/0179902 A1 | 7/2013 | Hoover et al. | |
| 2015/0071282 A1 | 3/2015 | Anders et al. | |
| 2015/0188829 A1 | 7/2015 | Satpathy et al. | |
| 2015/0220470 A1 | 8/2015 | Chen et al. | |
| 2015/0381707 A1* | 12/2015 | How | H04L 45/06 709/208 |

OTHER PUBLICATIONS

International Search Report and Written Opinion in International Application No. PCT/US2015/061451 dated Mar. 2, 2016, 8 pages.
Phi-Hung Pham et al., "Design and Implementation of Backtracking Wave-Pipeline Switch to Support Guaranteed Throughput in Network-on-Chip", Very Large Scale Integration (VLSI) Systems, IEEE Transactions on, Feb. 2012, vol. 20, No. 2, pp. 270-283.
Anders, et al., "A 2.9Tb/s 8W 64-Core Circuit-Switched Network-on-Chip in 45 nm CMOS," IEEE, 2008, 978-1-4244-2362-0/08 (pp. 182-185).
Anders et al., "A 4.1Tb/s Bisection-Bandwidth 560Gb/s/W Streaming Circuit-Switched 8×8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).
Chen et al., "A 340mV-to-0.9V 20.2Tb/s Source-Synchronous Hybrid Packet/Circuit-Switched 16×16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

\* cited by examiner

PARALLEL DIRECTION DECODE CIRCUITS FOR NETWORK-ON-CHIP

FIELD

The present disclosure relates in general to the field of computer development, and more specifically, to parallel direction decode circuits for a network-on-chip (NoC).

BACKGROUND

Networks-on-Chip (NoCs), for on-die communication between cores, are important in enabling scalable performance as the number of cores and intellectual property (IP) blocks increases in multi-core processors. In such instances, communication between components becomes the key power and performance limiter. NoCs enable efficient sharing of on-chip wiring resources for communication with routers to control and arbitrate the flow of data between communicating components.

NoCs transport data across chip between cores or other logic blocks. Latency is a critical performance metric, and is measured as the total delay through a network. A network with no traffic or arbitration overhead sends data at wire speeds (only interconnect and repeaters). In order to approach this latency, circuit-switched NoCs remove intra-route storage overhead. Furthermore, hybrid packet/circuit-switched NoCs move arbitration to a packet-switched stage to improve resource utilization. The critical path through the packet-switched portion of a router in these networks may involve several operations such as: i) latch data if needed, ii) decode direction relative to the current router, iii) arbitrate to determine priority for competing transmissions at each output port, and iv) send data to next router.

BRIEF DESCRIPTION OF THE DRAWINGS

Like reference numbers and designations in the various drawings indicate like elements.

DETAILED DESCRIPTION

Figure 1:
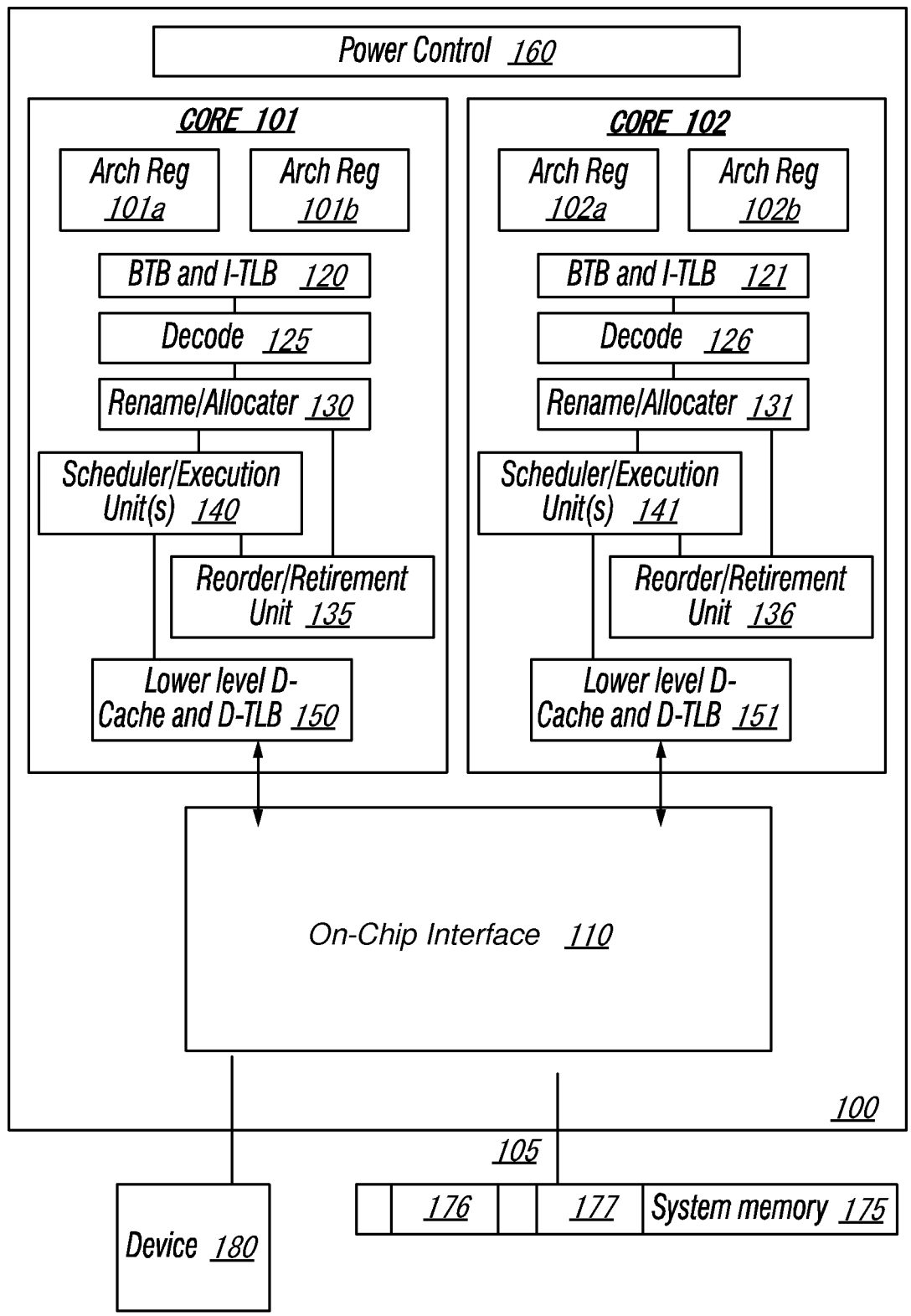
FIG. 1 illustrates a block diagram for an example computing system including a multicore processor in accordance with certain embodiments.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
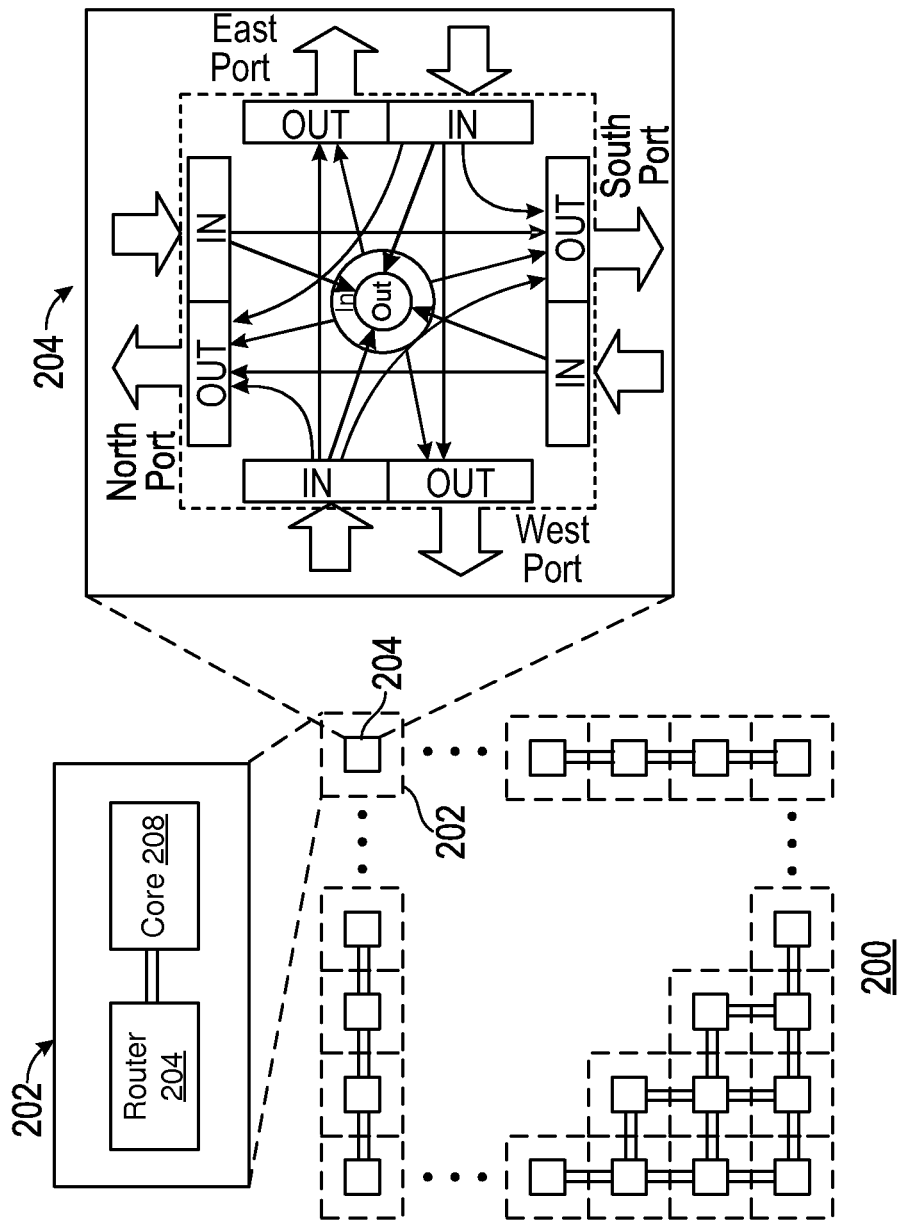
FIG. 2 illustrates a block diagram of a processor comprising a network on a chip (NoC) system including a plurality of routers in accordance with certain embodiments.

FIG. 2 illustrates a block diagram of a processor 200 comprising an NoC system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. Each network element 202 includes a router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 may be communicatively coupled to its own core 208 (or other logic block). As used herein, a reference to a core may also apply to other embodiments where a different logic block is used in place of a core. For example, a logic block may comprise a hardware accelerator (e.g., a graphics accelerator, multimedia accelerator, or video encode/decode accelerator), I/O block, memory controller, or other suitable fixed function logic. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet switched network. That is, the packet switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. The packet switched network may include buffering because a dedicated path is not assured from a source to a destination and so a packet may need to be stopped temporarily if two or more packets need to traverse the same link or interconnect.

In an embodiment, routers of processor 200 may be variously provided in two networks or communicate in two networks, such as a packet switched network and a circuit-switched network. Such a communication approach may be termed a hybrid packet/circuit-switched network. In such embodiments, packets may be variously communicated among the various routers 204 using resources of the packet switched network and the circuit-switched network. In order to transmit a single data packet, the circuit-switched network may allocate an entire path, whereas the packet switched network may allocate only a single segment (or interconnect). In some embodiments, the packet switched network may be utilized to reserve resources of the circuit-switched network for transmission of data between routers 204.

Router 204 may include a plurality of port sets to variously couple to and communicate with adjoining network elements 202. For example, circuit-switched and packet switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as processor logic of a "local" core 208. Herein, this port set will be referred to as a "core port set," though it may interface with logic other than a core in some implementations. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

Figure 3:
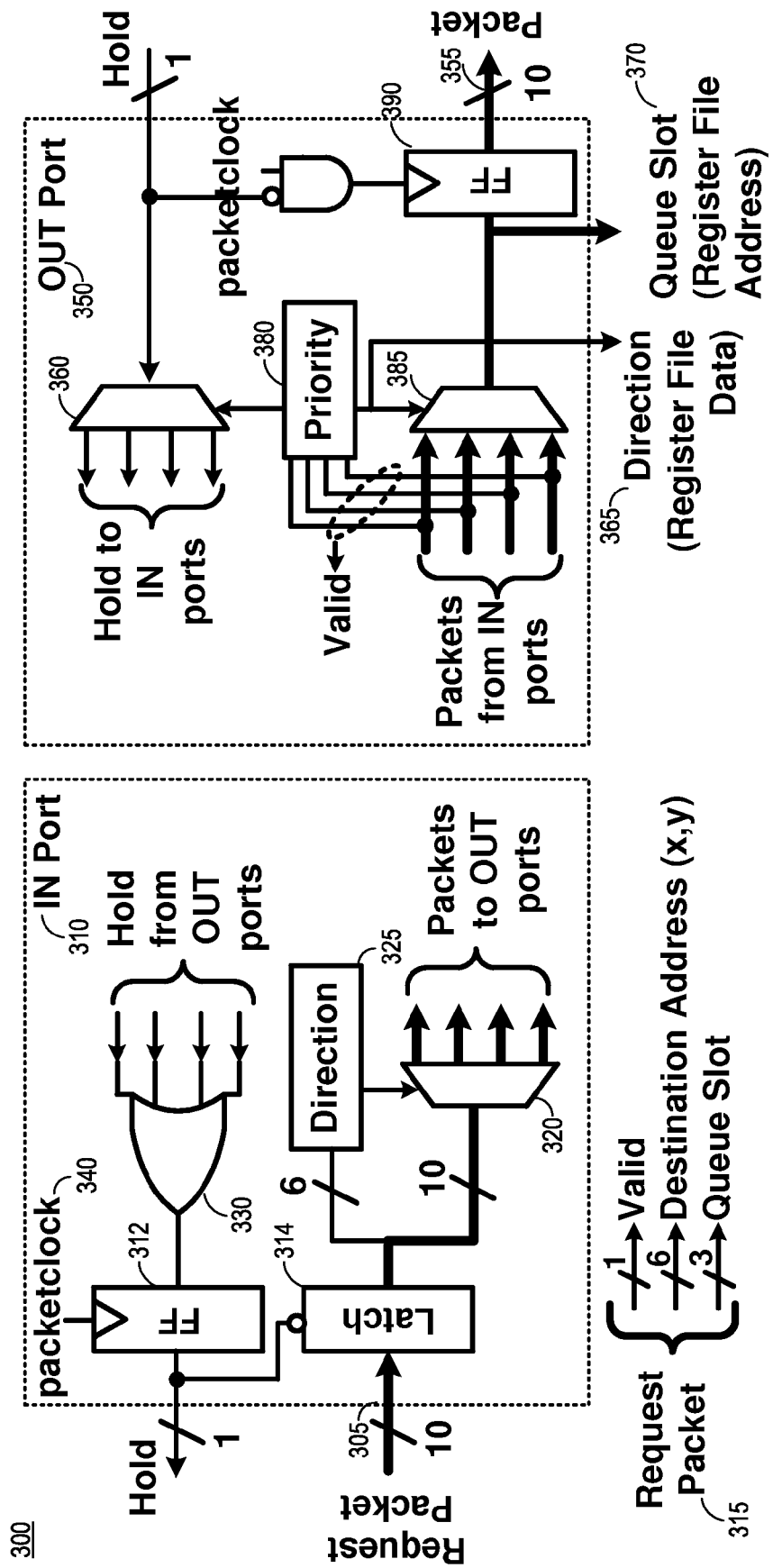
FIG. 3 illustrates a block diagram illustrating an example IN port and OUT port of a router using sequential address decode and packet arbitration in accordance with certain embodiments.

FIG. 3 illustrates a block diagram illustrating an example IN port 310 and OUT port 350 of a router 300 using sequential address decode and packet arbitration in accordance with certain embodiments. Router 300 may have any suitable characteristics described above with respect to router 204. Although only a single IN port and single OUT port is depicted, router 300 may have any suitable number of port sets. In the description below, router 300 will be assumed to have five port sets (including one port set for a core).

In an embodiment, router 300 includes an IN port 310 comprising a portion to receive packet-switched communications sent to router 300 and an OUT port 350 comprising a portion to send packet-switched information from router 300. IN port 310 and OUT port 350 may further comprise respective other portions (not shown) to exchange circuit switched information. For example, circuit-switched routing portions of the ports may include configuration logic to configure at least part of a respective circuit-switched path. In various embodiments, such configuration is performed in advance of router 300 receiving data to be communicated along that circuit-switched path.

IN port 310 may include various components facilitating packet routing, such as, among other possible components, flip flop 312, a latch set 314, demultiplexer logic 320, direction logic 325, and OR gate 330. IN port 310 receives a request packet 315 from a core or another router via input 305. Packet 315 may include any suitable information. For example, in the embodiment depicted, the packet 315 includes a valid bit, a six-bit destination address, and a three-bit queue slot. The valid bit may indicate whether the packet 315 is valid. For example, when a new packet arrives, the valid bit may be asserted. After the packet has been forwarded by the appropriate OUT port the valid bit may be deasserted so that the packet (which may still be stored by latch 314) is not forwarded again erroneously and the OUT port may forward the next valid packet. The destination address may indicate the destination of the packet (e.g., the network element to which the packet should be delivered) and may be expressed in any suitable manner. As one example, the destination address may include a three-bit address value indicating a location along an x-axis of a grid of the network and another three-bit address value indicating a location along a y-axis of the grid. The queue slot bits may indicate a location in a register file where information about the packet (e.g., a direction associated with the packet) is to be stored. In the embodiment depicted, the register file may have eight locations and so the queue slot is identified by three bits, though any suitable sizes may be used. In other embodiments, packet 315 may also include one or more sideband enable bits that indicate whether packet 315 includes data to be sent as part of a sideband communication. Packet 315 may also include bits to carry the sideband data. Thus, although packet 315 is shown as having ten bits, packet 315 may have any suitable number of bits.

A packet 315 enters the input and passes through latch 314 when the latch is not closed by a hold signal from flip flop 312. The packet is passed to demultiplexer logic 320. Demultiplexer logic 320 is operable to demultiplex the packet to any of a plurality of OUT ports of router 300. In some embodiments, the number of signal sets exiting the demultiplexer is equal to the number of OUT ports minus one (since a packet that came through an IN port of a port set would not be sent to the OUT port of that port set). The output of demultiplexer logic 320 is set by direction logic 325, which functions as an address decoder. Direction logic 325 is suitable to determine a direction to be associated with packet 315 based on information in the packet (e.g., the destination address) and/or other suitable information (such as the address of router 300). This direction may indicate which OUT port of router 300 the packet 315 should be routed to. For example, direction logic 325 may evaluate the destination address of the packet 315 and the address of router 300, determine a path of demultiplexer logic 320 for directing packet 315 to the correct OUT port, and then select that path such that packet 315 is forwarded to the correct OUT port while the other paths from demultiplexer logic 320 remain unasserted.

As depicted IN port may also include paths to receive hold signals. For example, the IN port may include one path to each OUT port of the other port sets to receive a hold signal from the respective port. The hold signals provide flow control. When a hold signal is received from any of the OUT ports, the output of OR gate 330 is asserted and this value is flopped on the next cycle of packetclock 340. This closes the latch from accepting additional packets 315 until the hold signal is cleared. This signal will be explained further below in connection with the OUT port.

OUT port 350 may include various components facilitating packet routing, such as, among other possible components, hold demultiplexer logic 360, priority logic 380, multiplexer logic 385, and flip flops 390. OUT port 350 receives a plurality of inputs (each operable to transport a packet 315 from a respective input port of router 300). Multiplexer logic 385 is operable to multiplex the inputs into a single output that is provided to output 355 through flip flops 390. In the embodiment depicted, in a cycle of the packetclock 340, multiplexer logic 385 may receive anywhere from one to four different packets (each packet received from a different input port of router 300) and select one packet to be passed through to the output 355 of OUT port 350.

Priority logic 380 functions as a packet arbitrator by selecting one of the valid packets (e.g., a packet having a valid bit that is asserted) from the IN ports (e.g., using a round-robin technique) and sends hold signals to the unselected IN ports via hold demultiplexer logic 360. Priority logic 380 sends a signal representing the selected packet to multiplexer logic 385, enabling multiplexer logic 385 to pass the selected packet to flip flops 390. The packet is flopped based on packetclock when the hold signal received by the OUT port is not asserted.

Priority logic 380 also sends direction data 365 associated with the selected packet to a register file. The direction data may specify which direction the packet 315 came from. For example, the direction data 365 may be an indication of the IN port from which the packet 315 was received. In particular embodiments, the direction data may be represented by a two-bit value, thus being able to identify any one of the four ports from which packets are received. The queue slot bits 370 of the selected packet are also passed to the register file and are used as an address to store the direction data 365 in the location of the register file specified by the queue slot bits 370. If the queue slot requested by the packet 315 is already full, the priority logic may assert a hold signal, thus preventing the packet from continuing. In an embodiment, the writing of the direction data 365 may be selectively prevented or modified when priority logic 380 determines that packet 315 is solely for communication of sideband data (that is, is not meant to setup a circuit-switched channel). In such an embodiment, the providing of output 370 may also be selectively prevented or otherwise altered.

The direction data written into the register file is used to facilitate the setup of the circuit-switched path. Each port in each router may include a similar register file. When the appropriate time for establishing the circuit-switched channel has arrived, each queue slot that includes direction information associated with the circuit-switched channel may be selected and the direction information used to configure multiplexers and demultiplexers in the routers from the source to the destination. Upon completion of data transfer through the circuit-switched channel, different queue slots in the register files are selected to set up further circuit-switched channels.

Figure 4:
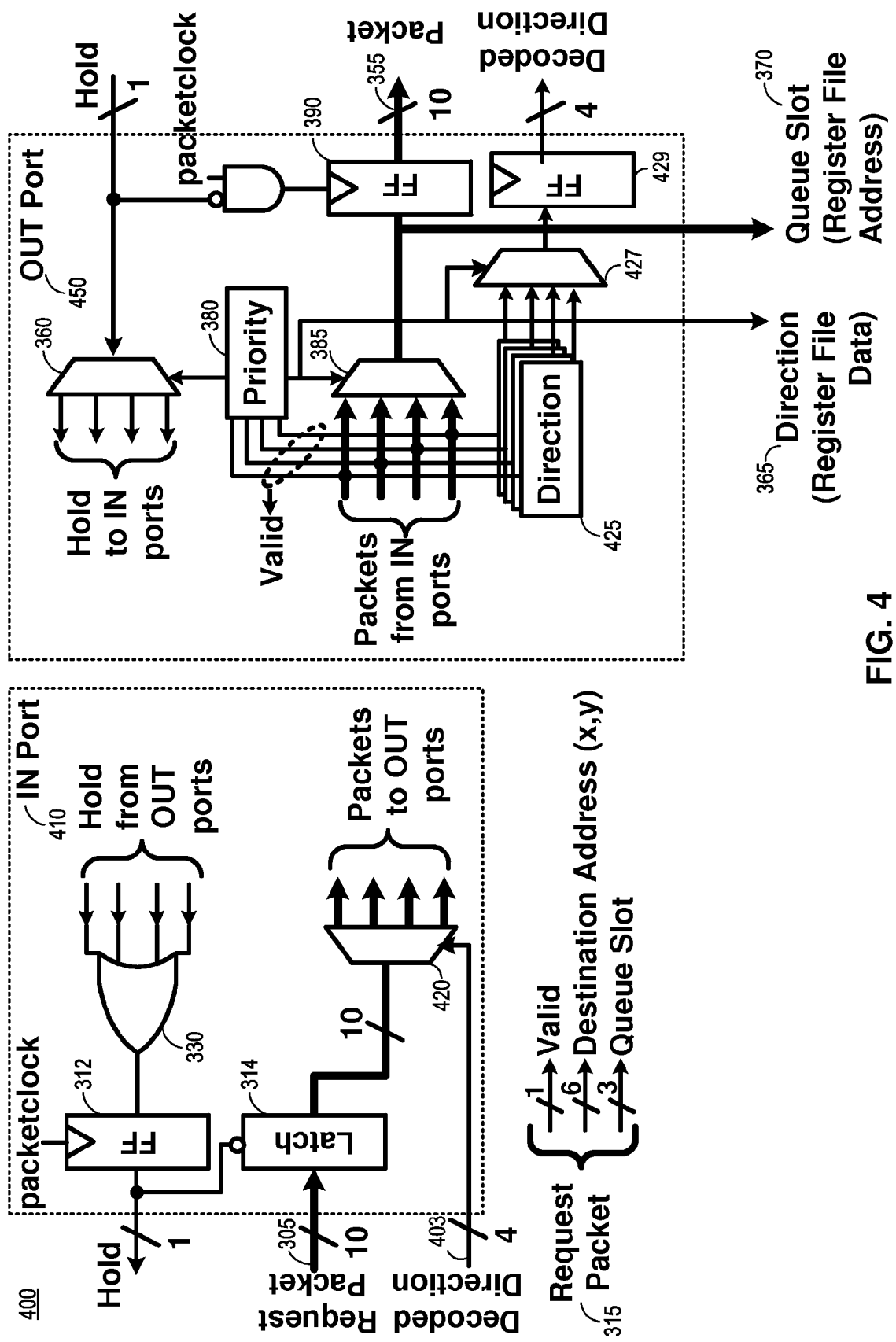
FIG. 4 illustrates a block diagram illustrating an example IN port and OUT port of a router using parallel address decode and packet arbitration in accordance with certain embodiments.

FIG. 4 illustrates a block diagram illustrating an example IN port 410 and OUT port 450 of a router 400 using parallel address decode and packet arbitration in accordance with certain embodiments. As illustrated in FIG. 3, packet-switched networks may determine directions of packets and perform arbitration among competing packets at each router from source to destination. The delay for decode and arbitration operations should be as small as possible in order to achieve the lowest overall network latency. As illustrated by FIG. 3, the address decoding and the packet arbitration may be done in a sequential nature in some implementations. However, in such implementations, the latency from the direction decode and arbitration is additive and thus not optimal. In the embodiment illustrated in FIG. 4, the address decode and packet arbitration occur in parallel, thus improving latency within an NoC by removing latency associated with the direction decode from the critical path.

Router 400 and the components therein may have any suitable characteristics of routers 300 and 204 and their respective components. However, router 400 may parallelize the address decode with other operations in the critical path (e.g., packet arbitration) in order to provide improved latency. Since the direction decode of a packet must be performed before packet arbitration on the packet may be performed (since a packet's direction determines which OUT port is used), various embodiments move the direction decode to the previous router to operate in parallel with the previous router's arbitration, for which there is no such sequential dependency. The decoded direction is then sent along with the packet to the router where it is used to route the packet to the correct OUT port of the router.

IN port 410 may operate in a similar fashion in many ways as IN port 310. However, IN port 410 does not include direction logic 325 to compute the correct OUT port for the incoming packet 315. Instead, IN port 410 receives the decoded direction 403 for this packet 315 along with the packet from the router that sends the packet 315. The decoded direction 403 may be any suitable format, such as that described above with respect to the output of direction logic 325. In the embodiment depicted, the decoded direction 403 is implemented as a one-hot implementation, where the asserted wire of the four wires indicates the OUT port that the packet 315 should be routed to. In another embodiment, the direction could be encoded in a two bit format with each unique bit combination indicating a different OUT port, thus conserving interconnect resources. The decoded direction signal 403 is sent to demultiplexer logic 420 and is used to control demultiplexer logic 420 to send packet 315 to the correct OUT port of router 400.

OUT port 450 also operates in a similar fashion in many ways as OUT port 350, but includes direction logic 425 that operates in parallel with priority logic 380. The OUT port 350 may include one instance of direction logic 425 for each IN port of router 400 that is coupled to OUT port 450. Thus, for a five-port router as illustrated in FIG. 2, OUT port 450 includes four instances of direction logic 425. Each instance of direction logic 425 determines a direction for a packet from a respective IN port of router 400. Because a packet has not been selected for forwarding yet, the direction is decoded for each of the incoming packets. This ensures that when priority logic 380 is finished arbitrating between the incoming packets, the selected packet and its decoded direction may be sent soon thereafter. Direction logic 425 may operate in a similar fashion to that described above with respect to direction logic 325, however the direction determined by direction logic 425 is a direction that the packet should be routed in the next router. For example, if OUT port 450 is configured to forward packets 315 to a router located "East" of router 400, then the direction determined by direction logic 425 for a packet 315 may indicate which OUT port of the router to the East of router 400 the IN port of the router to the East of router 400 should route the packet to.

The instances of direction logic 425 may operate in parallel with each other and in parallel with priority logic 380. When a packet is received from an IN port, the destination address of the packet is sent to an instance of direction logic 425 for direction decoding. Each valid bit of each packet is also sent to priority logic 380 so priority logic 380 can arbitrate between all of the valid packets to determine which packet should be forwarded to the output 355. If a packet is not selected for forwarding, its computed direction may be held by direction logic 425 (the direction is calculated only once by direction logic 425 for each packet and thus the overall energy use for direction decoding is generally equivalent to embodiments such as that shown in FIG. 3). If a packet is selected for forwarding, an indication of the direction of the packet (e.g., a direction indicating the location of the IN port that sent the packet) is output by priority logic 380 to control multiplexer logic 385 to pass the packet from that IN port and multiplexer logic 427 to pass the decoded direction associated with the packet. The direction of the packet is also sent to register file 365 at the queue slot indicated by the queue slot bits of the selected packet to facilitate establishment of a circuit switched channel based on the packet at the appropriate time. The selected packet and its associated decoded direction are forwarded by OUT port 450 to the next router through flip flop sets 390 and 429. The hold signals operate in a manner similar to that explained above with respect to router 300.

While the example shown indicates five-port routers, with each output port performing arbitration among four input directions and fixed x-first, y-second routing, various embodiments can include routers having more or less ports, or with other types of routing such as source-directed (wherein every direction to go is sent with the packet) or table-lookup based approaches.

Figure 5:
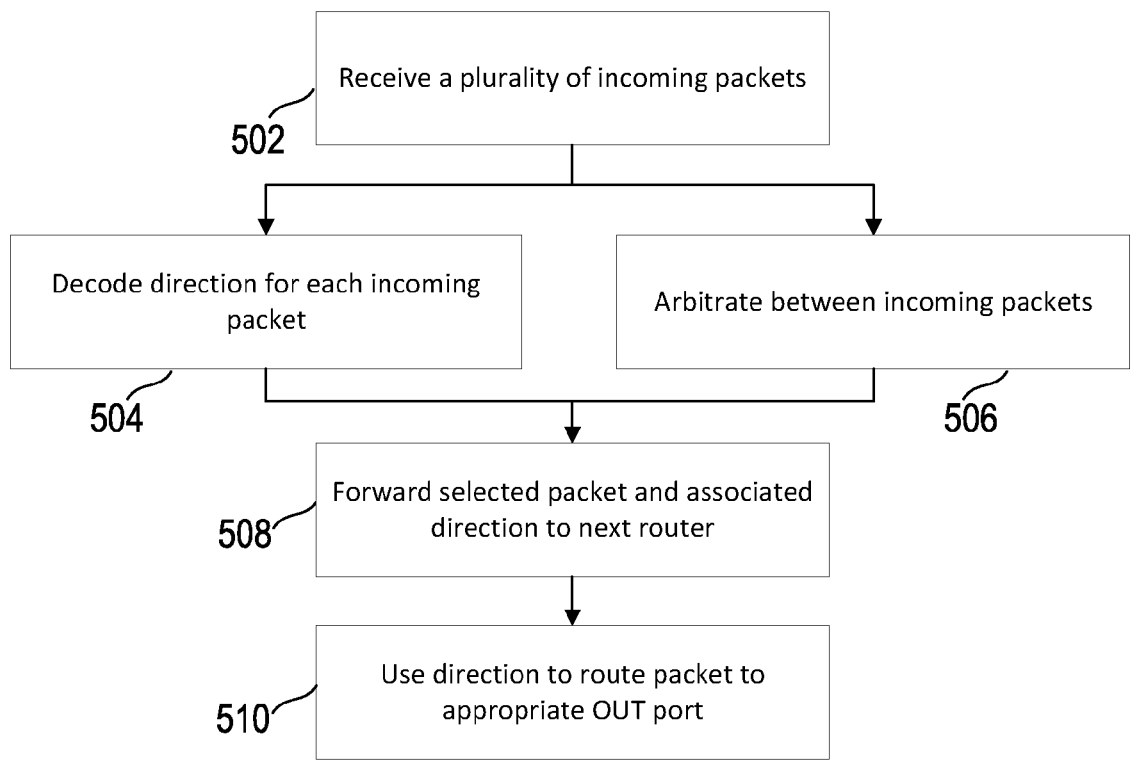
FIG. 5 illustrates an example method for performing address decoding and packet arbitration in parallel in accordance with certain embodiments.

FIG. 5 illustrates an example method for performing address decoding and packet arbitration in parallel in accordance with certain embodiments. Steps 502-508 may be performed by an OUT port of a first router and step 510 performed by a second router that is coupled to the OUT port of the first router. At step 502, a plurality of incoming packets are received. For example, an OUT port of a router may receive a packet from each IN port of the router (other than the IN port that is part of the same port set as the OUT port). As depicted, steps 504 and 506 may be performed in parallel. At step 504, a direction is decoded for each incoming packet. At step 506, one packet is selected from among the multiple incoming packets. After steps 504 and 506 have completed, the packet selected at step 506 and the direction determined for that packet at step 504 are forwarded to the second router at step 508. At step 510, an IN port of the second router uses the direction associated with the packet to route the packet to the appropriate OUT port of the second router. In some embodiments, steps 502-508 may be implemented by each of a plurality of OUT ports of a single router and step 510 may be implemented by each of a plurality of IN ports of the router. The steps may be repeated by various routers as packets traverse through the network.

Some of the steps illustrated in FIG. 5 may be combined, modified or deleted where appropriate, and additional steps may also be added to the flowchart. Additionally, steps may be performed in any suitable order without departing from the scope of particular embodiments.

As used in this application, when first logic operates "in parallel" with or "simultaneously" with second logic, at least a portion of the operations of the first logic occur at the same time as at least a portion of the operations of the second logic. These terms are not meant to convey that the operations of the first logic must begin or end at the same time.

Figure 6:
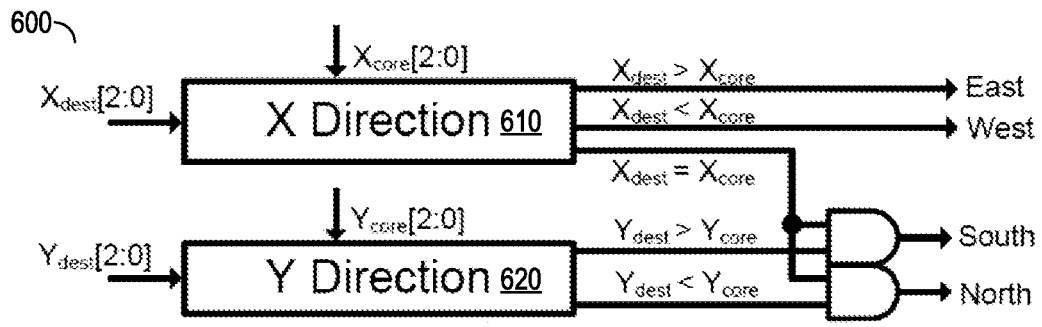
FIG. 6 illustrates example direction decode logic in accordance with certain embodiments.
Figure 6:
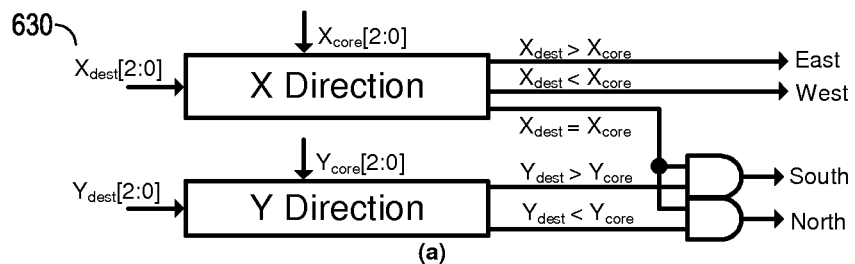
Figure 6:
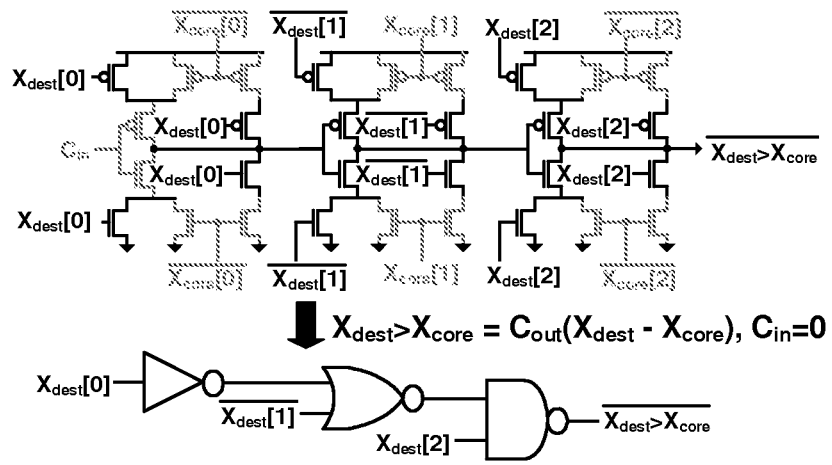

FIG. 6 illustrates example direction decode logic 600 in accordance with certain embodiments. Direction logic 600 illustrates example direction decode logic that may be used in direction logic 325 or 425, for example. Direction logic 600 is one example of logic for implementing x-first, y-second routing for a mesh NoC, such as system 200, although any suitable routing method may be used (e.g., y-first, x-second, table lookup, or other deterministic routing method). In the embodiment depicted, direction logic 600 includes first circuitry 610 to compare address values associated with a first dimension of a two-dimensional address space. That is, the x component of the destination address (Xdest[2:0]) is compared against the x component of the address of the router performing the comparison (Xcore[2:0]). Direction logic 600 further includes second circuitry 620 to compare address values associated with a second dimension of the address space. That is, the y component of the destination address (Ydest[2:0]) is compared against the fixed y component of the address of the router performing the comparison (Ycore[2:0]). Circuitry 630 illustrates one example of circuitry for performance of a three bit comparison, according to an embodiment. Based on the comparing by first circuitry 610 and second circuitry 620, direction logic 600 may determine whether a next routing of the packet from router 600 toward the destination node is to be in a particular direction—e.g. North, South, East or West relative to router 600. This may enable the forwarding of packets to the correct OUT port. As depicted by circuitry 630, a chain of ripple-carry gates implementing a three bit compare is optimally sized to account for fixed core addresses, resulting in a worst-case delay of an inverter followed by two gates.

Various embodiments above illustrate ports that may be used in the context of synchronous NoCs with explicit clocks and level sensitive control signals. A synchronous packet-switched NoC may comprise routers that communicate with their neighbors based on a global clock. Thus, all the routers in a synchronous NoC operate at the same frequency. In various synchronous implementations, no explicit credit tracking circuits are required since the placement of flip-flops and latches along with grant and request based clock-gating of storage elements may achieve the same result. The clock for the circuit-switched network may be derived from the clock for the packet-switched network and may be a multiple of the clock of the packet-switched network to account for the worst-case circuit-switched channel setup. Synchronized packet and circuit-switched network clocks also eliminate the need for priority FIFOs to handle write and read operations from independent clock domains. However, the embodiments of the present disclosure may be adapted for use in source-synchronous NoCs as well. In source-synchronous NoCs, control signal transitions forwarded along with the data act as clock signals, thus eliminating the need for a fully-synchronous clock. This technique facilitates multi-clock designs (wherein cores associated with different routers may operate at different frequencies) by removing the need for synchronizing FIFOs at each router.

Figure 7:
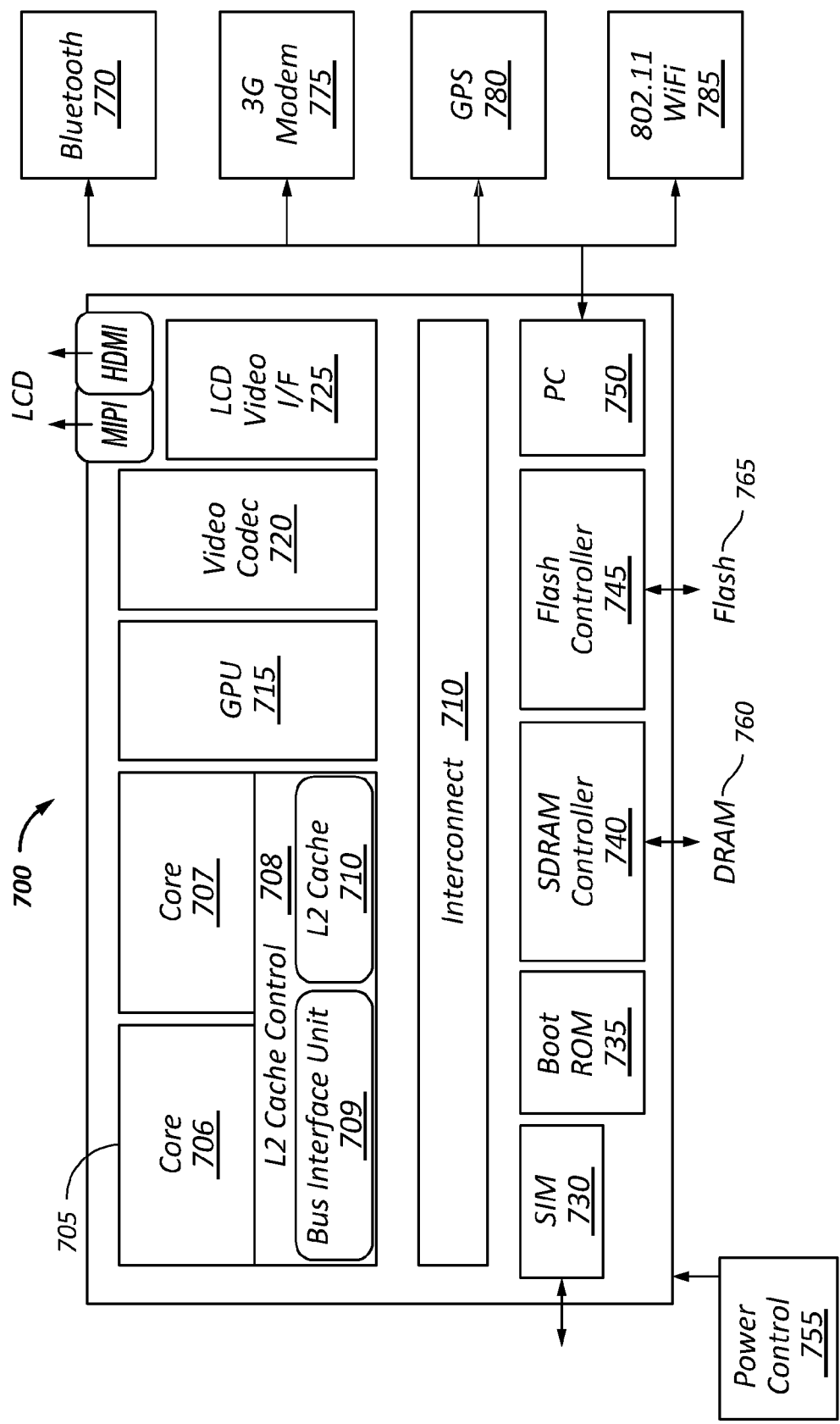
FIG. 7 illustrates another block diagram for an example computing system in accordance with certain embodiments.

FIG. 7 illustrates another embodiment of a block diagram for an example computing system in accordance with one embodiment. In this figure, an embodiment of a system on-chip (SOC) design in accordance with the disclosures is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 710 includes an on-chip interconnect, such as an IOSF, AMBA, or other interconnect discussed above, which potentially implements one or more aspects of the described disclosure.

Interface 710 provides communication channels to the other components, such as a Subscriber Identity Module (SIM) 730 to interface with a SIM card, a boot rom 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control Q1650 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

In addition, the system illustrates peripherals for communication, such as a Bluetooth module 770, 3G modem 775, GPS 785, and WiFi 785. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic (e.g., a router), a method, and a non-transitory machine readable medium (including information to represent structures, when manufactured, to be configured) to comprise a plurality of input ports to receive packets; a plurality of output ports to forward packets, wherein an output port is to comprise priority logic to select a packet from multiple packets to forward and direction logic to determine, for a packet of the multiple packets, a direction associated with the packet, wherein the direction logic is to be performed, at least in part, in parallel with the priority logic.

In at least one example, a direction determined by the direction logic of an output port is the direction a packet should be forwarded by a router that receives the packet from the first router via the output port.

In at least one example, an output port of the plurality of output ports is to forward the direction associated with a packet along with the packet to another router of the processor.

In at least one example, an input port of the plurality of input ports is to receive a packet and an indication of a direction associated with the packet and forward the packet to an output port of the plurality of output ports based on the received indication.

In at least one example, a first input port of the plurality of input ports of the first router is to receive packets from a core of the first router and the remainder of the plurality of input ports are to receive packets from a respective router of the processor.

In at least one example, a first output port of the plurality of output ports of the first router is to forward packets to a core of the first router and the remainder of the plurality of output ports are to forward packets to a respective router of the processor.

One or more embodiments may provide an apparatus, a system, a machine readable storage, a machine readable medium, hardware- and/or software-based logic (e.g., a first router), a method, and a non-transitory machine readable medium (including information to represent structures, when manufactured, to be configured) to receive a first packet and a first direction associated with the first packet, forward the first packet to an output port of a plurality of output ports of the first router based on the first direction associated with the first packet, determine a second direction associated with the first packet, the second direction based at least on an address of the first packet, and forward the first packet and the second direction through the output port of the first router to a second router.

In at least one example, the second direction is further based on an address associated with the second router.

In at least one example, the first router is further to select the first packet from a plurality of packets received at the output port and to forward the first packet based on the selection.

In at least one example, at least a part of the selection is to occur simultaneously with at least a part of the determination of the second direction associated with the first packet.

In at least one example, the first router is further to determine a direction for a packet of the plurality of packets received at the output port.

In at least one example, the first router is to simultaneously determine the direction of a packet of the plurality of packets received at the output port.

In at least one example, the first packet is a reservation packet used to establish a circuit switched channel to pass through the first router.

One or more embodiments may provide an apparatus, a system, a machine readable storage, a machine readable medium, hardware- and/or software-based logic (e.g., a first router), a method, and a non-transitory machine readable medium (including information to represent structures, when manufactured, to be configured) to comprise a plurality of cores and a plurality of routers implementing a network on a chip. A router is to comprise a core input port to receive packets from a core of the plurality of cores, a plurality of input ports, an input port to receive packets from a router of the plurality of routers, a core output port to forward packets to the core of the plurality of cores, and a plurality of output ports, an output port to forward packets to a router of the plurality of routers. An output port is to comprise priority logic to select a packet from multiple packets to forward and direction logic to determine, for a packet of the multiple packets, a direction associated with the packet, wherein the direction logic is to be performed, at least in part, in parallel with the priority logic.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
 a first router comprising:
  a plurality of input ports to receive packets;
  a plurality of output ports to forward packets, an output port of the plurality of output ports comprising:
   priority logic to select a packet from multiple packets to forward; and
   direction logic to determine, for a packet of the multiple packets, a direction associated with the packet, wherein the direction logic is to perform the direction determination, at least in part, in parallel with the selection of the packet by the priority logic.

2. The processor of claim 1, wherein a direction determined by the direction logic of the output port is the direction a packet should be forwarded by a router that receives the packet from the first router via the output port.

3. The processor of claim 1, wherein an output port of the plurality of output ports is to forward the direction associated with a packet along with the packet to another router of the processor.

4. The processor of claim 1, wherein an input port of the plurality of input ports is to receive a packet and an indication of a direction associated with the packet and forward the packet to an output port of the plurality of output ports based on the received indication.

5. The processor of claim 1, wherein the processor comprises a plurality of routers and wherein a first input port of the plurality of input ports of the first router is to receive packets from a core of the first router and the remainder of the plurality of input ports are to receive packets from a respective router of the processor.

6. The processor of claim 1, wherein the processor comprises a plurality of routers and wherein the output port of the plurality of output ports of the first router is to forward packets to a core of the first router and the remainder of the plurality of output ports are to forward packets to a respective router of the processor.

7. An apparatus comprising:
a first router operable to:
receive a first packet and a first direction associated with the first packet;
forward the first packet to an output port of a plurality of output ports of the first router based on the first direction associated with the first packet;
determine a second direction associated with the first packet, the second direction based at least on an address of the first packet; and
forward the first packet and the second direction through the output port of the first router to a second router.

8. The apparatus of claim 7, wherein the second direction is further based on an address associated with the second router.

9. The apparatus of claim 7, wherein the first router is further to select the first packet from a plurality of packets received at the output port and to forward the first packet based on the selection.

10. The apparatus of claim 9, wherein at least a part of the selection is to occur simultaneously with at least a part of the determination of the second direction associated with the first packet.

11. The apparatus of claim 9, wherein the first router is further to determine a direction for a second packet of the plurality of packets received at the output port.

12. The apparatus of claim 11, wherein the first router is further to select the first packet simultaneously, at least in part, with the determination of the direction of the second packet of the plurality of packets received at the output port.

13. The apparatus of claim 7, wherein the first packet is a reservation packet used to establish a circuit switched channel to pass through the first router.

14. A method comprising:
receiving a first packet and a first direction associated with the first packet;
forwarding the first packet to an output port of a plurality of output ports of a first router based on the first direction associated with the first packet;
determining a second direction associated with the first packet, the second direction based at least on an address of the first packet; and
forwarding the first packet and the second direction through the output port of the first router to a second router.

15. The method of claim 14, wherein the second direction is further based on an address associated with the second router.

16. The method of claim 14, further comprising selecting the first packet from a plurality of packets received at the output port and forwarding the first packet based on the selection.

17. The method of claim 16, wherein at least a part of the selection is to occur simultaneously with at least a part of the determination of the second direction associated with the first packet.

18. The method of claim 14, further comprising determining a direction for a second packet of the plurality of packets received at the output port.

19. The method of claim 14, wherein the first packet is a reservation packet used to establish a circuit switched channel to pass through the first router.

20. A system comprising:
a plurality of cores;
a plurality of routers implementing a network on a chip, a router of the plurality of routers comprising:
a core input port to receive packets from a core of the plurality of cores;
a plurality of input ports, an input port of the plurality of input ports to receive packets from a router of the plurality of routers;
a core output port to forward packets to the core of the plurality of cores;
a plurality of output ports, an output port of the plurality of output ports to forward packets to a router of the plurality of routers, the output port to comprise:
priority logic to select a packet from multiple packets to forward; and
direction logic to determine, for a packet of the multiple packets, a direction associated with the packet, wherein the direction logic is to perform the direction determination, at least in part, in parallel with the selection of the packet by the priority logic.

* * * * *